E. W. MIX.
GUIDE BEARING.
APPLICATION FILED JULY 3, 1907.
953,216.
Patented Mar. 29, 1910.
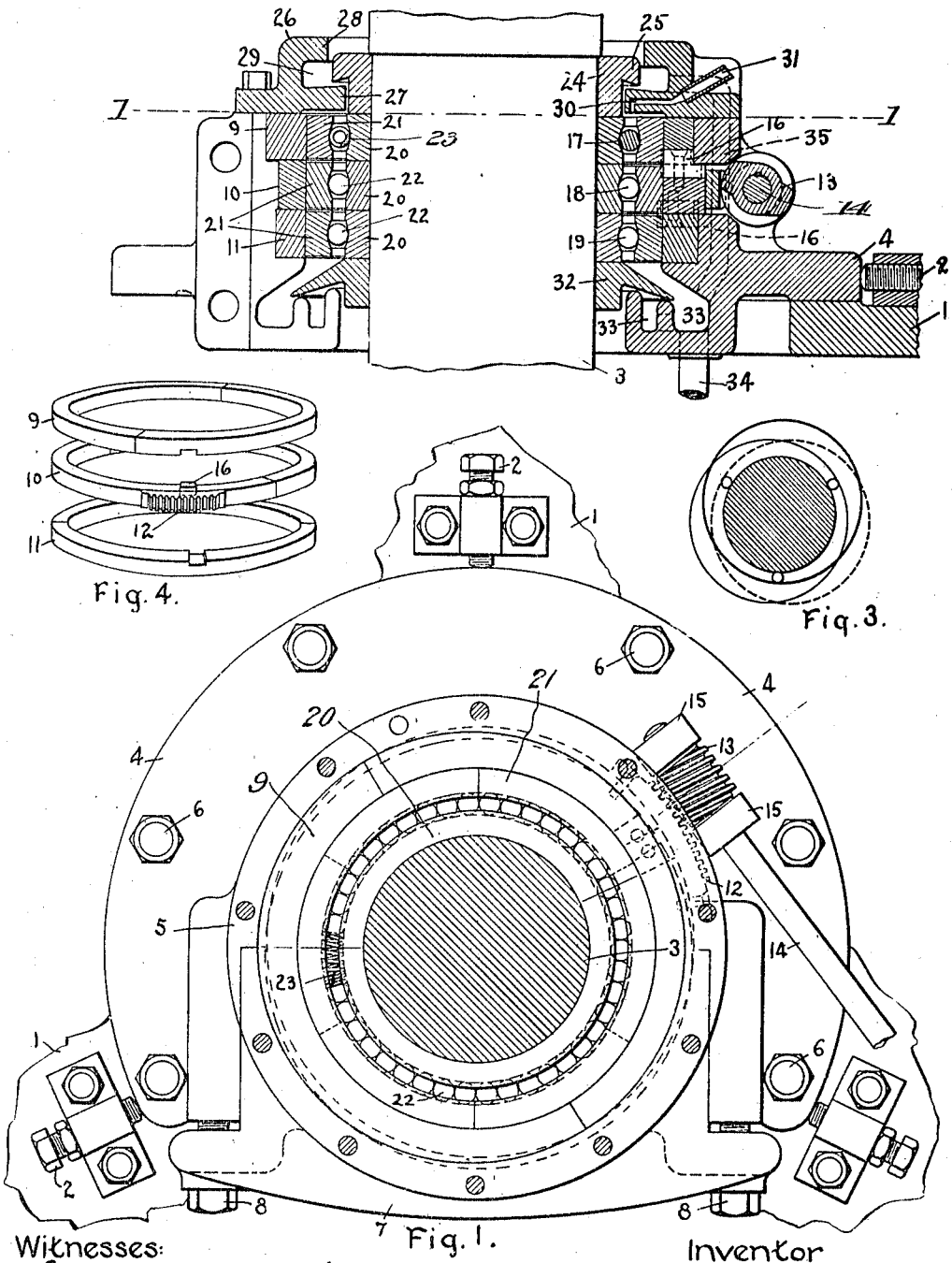
Witnesses:
Benjamin B. Hull
Helen Orford
Inventor
Edgar W. Mix.
by Albert G. Davis
Att'y.

UNITED STATES PATENT OFFICE.

EDGAR WOODS MIX, OF PARIS, FRANCE, ASSIGNOR TO GENERAL ELECTRIC COMPANY, A CORPORATION OF NEW YORK.

GUIDE-BEARING.

953,216.  Specification of Letters Patent.  Patented Mar. 29, 1910.

Application filed July 3, 1907. Serial No. 382,031.

*To all whom it may concern:*

Be it known that I, EDGAR WOODS MIX, a citizen of the United States, residing at Paris, France, have invented certain new and useful Improvements in Guide-Bearings, of which the following is a specification.

The invention relates to bearings used more particularly to guide or steady a rotating vertical shaft and the object thereof is the provision of a bearing which is readily assembled and dismounted, which may be finely or closely adjusted and which also prevents vibration of the shaft.

In the accompanying drawing illustrating one embodiment of the invention, Figure 1 is a top view of the bearing with the shaft shown in section on the line 1—1, Fig. 2, and the cover removed; Fig. 2 is a vertical section of the bearing; Fig. 3 is an exaggerated diagrammatic view showing the relation between the shaft and bearing and the manner of adjusting this relation; and Fig. 4 is a perspective view of the bearing rings, shown separated from each other.

The bearing is adapted for use in generators, turbines and a variety of other machines.

Mounted on the frame 1 of the machine are three adjusting screws 2 equally spaced about the axis of the shaft 3 and provided with suitable locking nuts to secure them in their adjusted positions. The ends of these screws engage the periphery of the flange 4 on the bearing 5 which is secured in its adjusted position on the frame by bolts or studs 6. The holes in the flange which receive the body portion of the bolts are made sufficiently larger than the bolts to permit the necessary range of adjustment when centering the bearing by means of the screws 2.

The bearing 5 is provided with a cap 7 which is held in place by bolts 8. The interior of the bearing and cap is bored out to receive three eccentric rings 9, 10 and 11 which are preferably made in halves, the halves being secured together in any suitable manner. The centers of the circular recesses which receive the rings are eccentric to the axis of the shaft 3 and are equally spaced about the axis, that is the centers are 120° apart, as indicated in Fig. 2. The ring 10 is provided with a gear segment 12 which projects through an opening in the body of the bearing and meshes with the worm 13. The worm is secured to a shaft 14 suitably mounted in bearings 15 upon the flange 4. Some means for actuating the shaft 14 is located at a place which is convenient for the attendant. Other forms of gearing can be substituted for the worm gearing if desired. The ring 10 is provided with keys 16 which engage keyways or slots in the rings 9 and 11.

Between the rings 9, 10 and 11 and the shaft are ball bearings 17, 18 and 19. These bearings comprise ball race-rings 20 carried by the shaft and coöperating ball race-rings 21 secured to the rings 9, 10 and 11. The ball race-rings 21 are preferably made in halves for convenience in assembling and removing the bearing parts and the halves are secured together in any suitable manner. Each set of ball race-rings contains a series of balls 22 which are kept in proper engagement by a spring 23.

Attached to the shaft above the ball bearings is a collar 24 having a flange 25. A casing or cover 26 is secured to the top of the bearing 5 and provided with an internal flange 27 which projects beneath the flange 25 and also with another flange 28 which surrounds the top of the flange 25, thus forming an oil-receiving chamber 29 within the casing. One or more oil ducts 30 lead from the outside of the cover 26 to a point over the balls 22. Pipes 31 conduct lubricant from any suitable source to these ducts.

Attached to the shaft at the bottom of the ball bearings is an oil thrower 32 for throwing the lubricant passing downward from the bearing outward into the channels or grooves 33 formed in the lower part of the bearing and its cap, thus preventing any oil from flowing down the shaft to be wasted or to damage apparatus located below the bearing. The grooves or channels 33 are connected at intervals and a drain 34 conducts lubricant away from the bearing. Any lubricant which works upward is thrown outward by the flange 25 into the chamber 29 which is connected to one of the grooves 33 by a drain 35 shown in dotted lines, Fig. 2.

By turning the shaft 14 and its worm 13, the three eccentric rings 9, 10 and 11 are turned in unison in the eccentrically located circular recesses in the body of the bearing and the play at the three points of contact, Fig. 3, can be increased or decreased at will. The eccentric rings touch the race rings 21 at every point of their outside circumference, whereas, each of said rings 21 receives pressure from the shaft through the balls at only one point or region of its inside circumference or bore. The actual bearing occurs only at three places 120° apart and permits the joints between the segments of the rings to be so located that there is no bearing on or at these joints. The eccentricity is so small that the balls not transmitting pressure cannot fall out between the rings 20 and 21. The clearance between said balls and the rings is so small relatively to the dimensions of the bearing members that it does not show in the drawing. The eccentricity is also so small that the engagement of the worm with the segment 12 is not appreciably interfered with.

The bearing can be inspected, dismounted or assembled without taking out the shaft or removing any of the machine parts attached to it. The bearing can also be readily adjusted with certainty to secure a fine degree of adjustment since a comparatively large movement of the shaft 14 produces but a slight movement of the rings. Thus it is possible to take up practically all of the play between the shaft and the bearing at the above mentioned points and do away with the vibration which occurs in other structures due to the play between the shaft and the bearing. The balls 22 so reduce the friction that the close engagement of the shaft and the bearing at the three places or regions does not interfere with the rotation of the shaft and smooth, steady running results. As the shaft wears, further adjustment of the rings takes up the play due to wear and restores the bearing to its original condition.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. The combination with a shaft, of a guide bearing for the shaft comprising rotary anti-friction devices between the shaft and the body of the bearing which are located in parallel planes, and means for simultaneously adjusting the engagement of said devices with the shaft to cause them to support or guide it at a plurality of points equally spaced about its circumference.

2. A guide bearing for a shaft comprising means which engage the shaft at three points 120° apart and located in different planes, and devices for adjusting said means to vary the play of the shaft at said points.

3. The combination of a shaft, a guide bearing for the shaft, and means located in parallel planes for adjusting the bearing surface relative to the shaft to vary the play between them and to cause the bearing surface to engage the shaft at three points equally spaced about its axis and located in said planes.

4. The combination of a shaft, and a ball bearing for guiding the shaft comprising balls, ball race rings on the shaft, coöperating ball race rings adjustably mounted in the body of the bearing, and means for adjusting the last named race rings to vary the play of the shaft and to cause the balls to support or guide it at three points equally spaced about its axis.

5. The combination of a shaft, a guide bearing for the shaft having a plurality of circular recesses whose centers are eccentric to the axis of the shaft and located at points equally spaced about the axis, there being ball races carried by the shaft, eccentric rings carrying coöperating ball races and mounted in said recesses, balls in said races, and means for turning said rings in said recesses to vary the clearance between the balls and their races and to cause the balls to guide or support the shaft at a plurality of points equally spaced about its circumference.

6. The combination of a shaft, a guide bearing for the shaft having three recesses whose centers are eccentric to the axis of the shaft and equally spaced about said axis, eccentric rings mounted in the recesses, there being ball races carried by the rings and coöperating ball races carried by the shaft, balls in said races, and means for turning the rings in unison in the recesses to vary the clearance between the balls and their races and to cause the balls to guide or support the shaft at three points equally spaced about its circumference.

7. The combination of a shaft, a guide bearing for the shaft having three circular recesses and three eccentric rings mounted therein, the centers of the rings and recesses being eccentric to the axis of the shaft and equally spaced about said axis, there being ball races carried by the shaft and coöperating ball races carried by the rings, balls in said races, means for turning one of the rings, and connections between said ring and the other two rings to cause all of the rings to move in unison in said recesses to vary the play of the shaft and bring the balls into guiding relation to said shaft at three points equally spaced about its circumference.

8. The combination of a shaft, a guide bearing for the shaft having three circular recesses and three eccentric rings mounted therein whose centers are eccentric to the axis of the shaft and located at intervals of 120° about said axis, there being ball races carried by the shaft and coöperating ball races carried by the rings, balls in said races, a gear segment on one of the rings, a gear meshing with the segment, means for actuating the gear, and connections between said ring and the other rings to cause the three rings to turn in unison in said recesses to adjust the bearing relative to the shaft.

9. The combination of a shaft, a guide bearing for the shaft provided with a cap, the bearing and cap having three circular recesses formed therein, one above the other, with their centers eccentric to the axis of the shaft and located at intervals of 120° about said axis, eccentric rings mounted in the recesses, there being ball races carried by the rings and coöperating ball races carried by the shaft, balls in said races, gearing for turning the middle ring in its recess, connections between the middle ring and the other two rings which cause the three rings to move in unison to adjust the bearing relative to the shaft, and means for lubricating the bearing.

10. The combination of a shaft, a guide bearing for the shaft having three circular recesses or seats and three eccentric rings mounted therein, said rings being formed in segments and the centers of the recesses and rings being eccentric to the axis of the shaft and equally spaced about said axis, there being ball races carried by the shaft and coöperating ball races attached to the segments of the rings, balls in said races, and means for turning the rings in unison in said seats to cause the balls to guide or support the shaft at three points equally spaced around its axis, the joints between the segments of the rings and races being located remote from the points of contact.

11. The combination of a shaft, a frame, a guide bearing for the shaft having a flange, means mounted on the frame and engaging the flange for centering the bearing, there being ball races carried by the shaft and coöperating ball races adjustably mounted in the body of the bearing, balls in said races, and means for adjusting the last-named races to vary the play of the shaft in the bearing and to cause the balls to support or guide the shaft at three points 120° apart about the axis of said shaft.

In witness whereof, I have hereunto set my hand this seventeenth day of June, 1907.

EDGAR WOODS MIX.

Witnesses:
GEORGE MYRMIRIAN,
DEAN B. MASON.